United States Patent
Zhang

(10) Patent No.: US 9,584,626 B2
(45) Date of Patent: Feb. 28, 2017

(54) PERFORMING AUTOCOMPLETE OF CONTENT

(71) Applicant: Alibaba Group Holding Limited, George Town (KY)

(72) Inventor: Liming Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 648 days.

(21) Appl. No.: 13/869,819

(22) Filed: Apr. 24, 2013

(65) Prior Publication Data

US 2013/0290410 A1    Oct. 31, 2013

(30) Foreign Application Priority Data

Apr. 28, 2012  (CN) .......................... 2012 1 0132852

(51) Int. Cl.
| | | |
|---|---|---|
| G06F 15/16 | (2006.01) | |
| G06F 15/173 | (2006.01) | |
| H04L 29/06 | (2006.01) | |
| G06F 17/27 | (2006.01) | |
| G06F 9/50 | (2006.01) | |

(52) U.S. Cl.
CPC .............. H04L 67/42 (2013.01); G06F 9/505 (2013.01); G06F 17/276 (2013.01)

(58) Field of Classification Search
CPC ....... H04L 67/42; H04L 7/042; H04L 12/417; G06F 3/0237; G06F 3/04883; G06F 17/30395; G06F 17/30864; H04N 21/437; H04W 28/02
USPC ....... 709/203, 206, 210, 217, 219, 224, 225, 709/200, 230, 231, 232, 234, 235
See application file for complete search history.

(56) References Cited

U.S. PATENT DOCUMENTS

| | | | | |
|---|---|---|---|---|
| 5,696,969 | A | * | 12/1997 | Egolf .................... G06F 9/5055 718/102 |
| 6,944,188 | B2 | * | 9/2005 | Sinha .................... H04J 3/0658 370/328 |
| 7,500,242 | B2 | | 3/2009 | Shah et al. |
| 7,636,767 | B2 | * | 12/2009 | Lev-Ran ............... H04L 12/583 709/218 |
| 7,676,517 | B2 | | 3/2010 | Hurst-Hiller et al. |
| 8,060,639 | B2 | | 11/2011 | Smit et al. |
| 8,893,209 | B2 | * | 11/2014 | Albano ............... H04L 12/2801 370/501 |
| 2005/0055593 | A1 | * | 3/2005 | Shah ...................... G06F 9/526 713/375 |
| 2006/0155840 | A1 | * | 7/2006 | Giffin ................. H04B 7/18578 709/224 |
| 2006/0242109 | A1 | | 10/2006 | Pereira et al. |
| 2007/0088686 | A1 | * | 4/2007 | Hurst-Hiller ..... G06F 17/30395 |

(Continued)

FOREIGN PATENT DOCUMENTS

| | | |
|---|---|---|
| JP | H0660121 | 3/1994 |
| JP | H11212705 | 8/1999 |

*Primary Examiner* — Edward Kim
(74) *Attorney, Agent, or Firm* — Van Pelt, Yi & James LLP

(57) ABSTRACT

Performing autocomplete of content is disclosed, including: generating a status lock configured to control sending requests to a server; generating a first suggestion request that includes a user input character; in response to an indication that the status lock is available, acquiring the status lock for the first suggestion request and sending the first suggestion request to the server; and in response to receipt of suggested content corresponding to the character from the server, releasing the status lock.

17 Claims, 10 Drawing Sheets

(56) References Cited

U.S. PATENT DOCUMENTS

| | | | |
|---|---|---|---|
| 2007/0124415 A1* | 5/2007 | Lev-Ran | H04L 12/583 709/217 |
| 2009/0119581 A1* | 5/2009 | Velusamy | G06F 17/276 715/256 |
| 2010/0164897 A1* | 7/2010 | Morin | G06F 3/0237 345/173 |
| 2010/0169341 A1 | 7/2010 | Hu et al. | |
| 2010/0325136 A1 | 12/2010 | Chaudhuri et al. | |
| 2011/0131321 A1* | 6/2011 | Black | G06F 1/3203 709/224 |
| 2013/0346593 A1* | 12/2013 | Setlur | H04L 29/14 709/224 |

* cited by examiner

PERFORMING AUTOCOMPLETE OF CONTENT

CROSS REFERENCE TO OTHER APPLICATIONS

This application claims priority to People's Republic of China Patent Application No. 201210132852.7 entitled A METHOD, DEVICE AND SERVER FOR AUTOCOMPLETE CONTENT ENTRY IN HANDHELD EQUIPMENT, filed Apr. 28, 2012 which is incorporated herein by reference for all purposes.

FIELD OF THE INVENTION

The present application relates to network technology. In particular, it relates to techniques for autocomplete of content.

BACKGROUND OF THE INVENTION

Mobile devices can provide users with network services via the Internet. Sometimes, when a user conducts searches or queries via an Internet application (e.g., a search engine) on a mobile device, an autocomplete function associated with the mobile device generates suggestion requests based on the user input characters and sends them to a server. After receiving a suggestion request, the server will send back suggested content related to the entered characters. For example, a suggestion box may appear on the screen of the mobile device that displays the suggested content received from the server. In a first example, while using an application on the mobile device to conduct a search, if a user inputs the character "中 [zhong]", popular suggestions such as "中国 [Zhongguo]" or "中央 [zhongyang]" may appear in the suggestion box. In a second example, a user may look up information associated with users for which contact information is stored by inputting characters. The user may input a part of the pingyin (romanization of Chinese characters) such as, "z", and then the suggested content that appears in the suggestion box will include characters whose pingyin starts with "z", such as "张 [Zhang]".

Autocomplete techniques sometimes rely on communicating with a server over a network in order to operate properly. However, the network signals detected by the mobile device may vary depending on where the user is located. As a result, the rate at which a user may input characters into an application on the mobile device may outpace the rate at which the mobile device is able to send and receive data with the server, which can cause a delay in the return of suggested content to the mobile device. As the mobile device waits on suggested content to be returned for certain user input characters, the user may have input additional characters. In such situations, multiple instances of suggested content eventually returned from the server may all at once and out of the sequence they were intended to arrive at the mobile device, or a suggested content for a later input character may be received at the mobile device before a suggested content for an earlier input character is received. Such behavior may lead to a disorganization of suggested content and an overall poor user experience.

For example, a user who is using a mobile device wants to look up information on another user, "王菲 [Wang Fei]", in application A. Conventionally, when the user inputs the first character "w," the suggestions of individual characters having the same pingyin such as "王 [Wang]", "汪 [Wang]" and so on, will be sent back from the server. When the user inputs the second character "f", an association may be made with the first character, "w", and the suggestion of set of characters "王菲 [Wang Fei]" will be sent back. At this point, the user can quickly find the name and other stored information of this other user.

However, assume that the network signal detected by the mobile device is weak—for example, the user is on a train, and the train is passing through a tunnel so that the signal detected by the mobile device is obstructed by the tunnel. Assume that while the detected signal is weak (or non-existent), the user inputs the first character "w" into an application executing on the mobile. Because at this time, the user is still on the train that is in a tunnel, the network signal is weak and so the suggestion request is either not sent to the server or that the suggested content sent by the server cannot be received at the mobile device. Later, the second character "f" is input into application when the train has already come out of the tunnel and the network signal is strong again, the suggested content returned to the mobile device may include individual characters "妃 [Fei]", "范 [Fan]", which are all based on the second input character of "f". The server may eventually receive a retransmission of the first input character "w" but the server may assume that it was input after "w", and return the suggested content of set of characters "范伟 [Fan Wei]", which is based on the incorrect assumption that the character "w" was input after the character "f". As such, the possibility of poor network signal may disturb the manner in which autocomplete functions and cause the wrong suggested content to be sent from the server.

BRIEF DESCRIPTION OF THE DRAWINGS

Various embodiments of the invention are disclosed in the following detailed description and the accompanying drawings.

DETAILED DESCRIPTION

Figure 1:
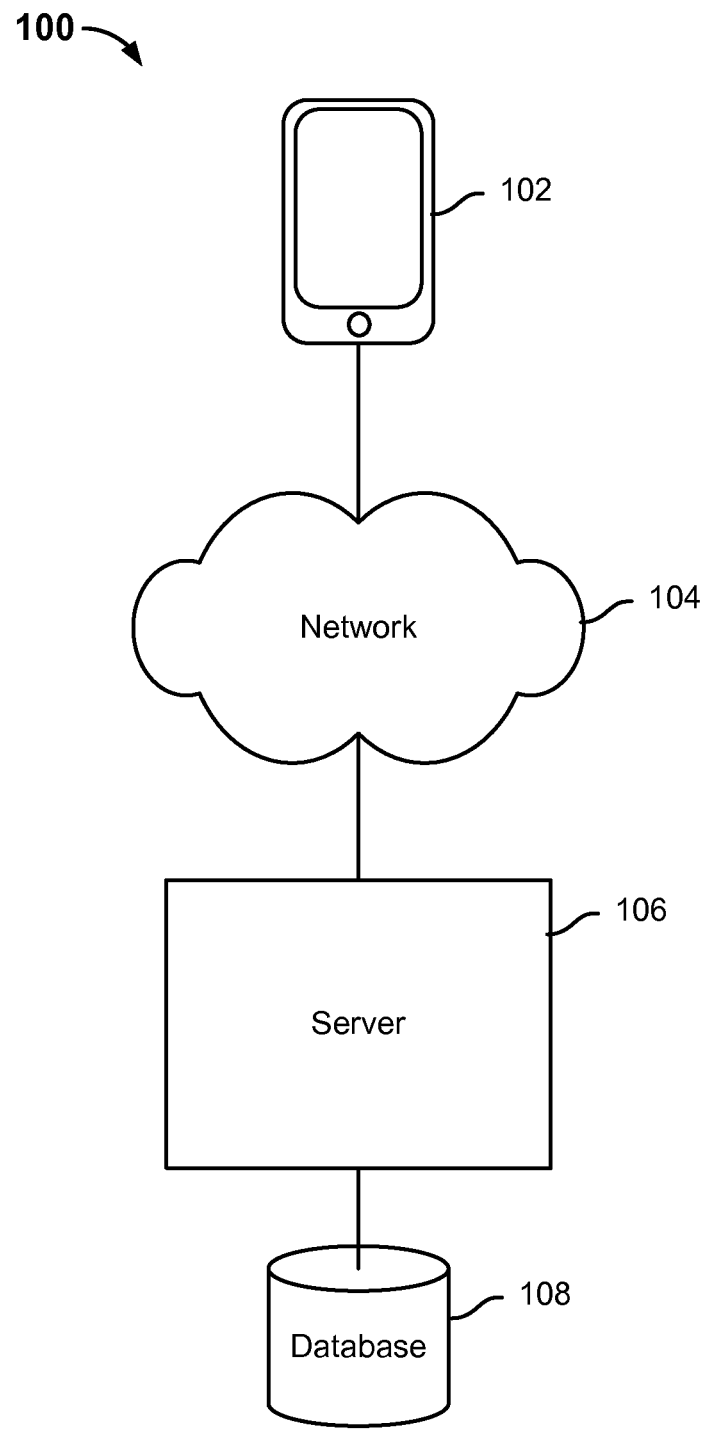
FIG. 1 is a diagram showing an embodiment of a system for performing autocomplete of content.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of performing autocomplete of content are described herein. In various embodiments, a suggestion request is generated at a client device in response to a user input of a character (or a set of characters) and then is sent to a server. The server will process the suggestion request and return suggested content based on the character associated with the suggestion request (and in some embodiments, in addition with other contextual information). In various embodiments, a locking mechanism is used to ensure that suggested content for each of the characters input by the user is generated by the server in the same sequence that the characters appear in the input box at the client device. As a result, the server will return suggested content that corresponds to the same sequence of characters that were input by the user. By processing the user input characters in the correct sequence, the server is able to consider appropriate contextual information associated with later input characters (e.g., based on the earlier input characters) and/or avoid sending suggested content that arrive at the client device out of sequence and without being clearly associated to their corresponding user input characters.

FIG. 1 is a diagram showing an embodiment of a system for performing autocomplete of content. In the example, system 100 includes client device 102, network 104, server 106, and database 108.

Client device 102 is configured to communicate with server 106 over network 104. While client device 102 is shown to be a smart phone, other examples of client device 102 are a laptop computer, a desk top computer, a mobile device, a tablet device, and/or any other computing device. Client device 102 includes an input interface (e.g., a physical keyboard or touchscreen) through which a user may input characters and also a display interface at which information may be displayed for the user. In various embodiments, client device 102 is configured to communicate with server 106 to perform autocomplete of content at client device 102. In various embodiments, autocomplete of content refers to prediction of a character and/or word that a user desires to type based on content that the user has already input. In various embodiments, certain applications (e.g., search engine, text editor, web browsers, email programs) installed at client device 102 include input boxes or fields in which users may input characters/words. In response to a character (or set of characters such as a word or phrase) input by the user, the application with autocomplete capabilities that is executing on client device 102 generates a suggestion request that includes the input character(s) as a pass parameter. The pass parameter in a suggestion request is a parameter that will be extracted and processed by server 106, as described in greater detail below. In various embodiments, a status lock is generated at client device 102 that is used to control when suggestion requests may be sent to server 106. In various embodiments, a suggestion request generated at client device 102 is only sent to server 106 when the status lock has been acquired for the suggestion request. In various embodiments, only one suggestion request may acquire the status lock at one time. When a suggestion request is able to acquire the status lock, it is sent from client device 102 to server 106.

Server 106 is configured to receive suggestion requests from client devices such as client device 102. For a received suggestion request, server 106 is configured to extract the character (or set of characters) from the pass parameter of the suggestion request and determine suggested content corresponding to the extracted character(s). Server 106 may use data stored at database 108 to determine the suggested content that corresponds to the extracted character(s). For example, database 108 can store historical data associated with characters previously input together by one or more users, common words or phrases, information specifically stored for one or more users, and/or other techniques used for autocomplete. Once server 106 determines the appropriate suggested content for the extracted character(s), server 106 is configured to send the suggested content back to client device 102, and the application with autocomplete capabilities that is executing on client device 102 will display at least a subset of the suggested content to the user. For example, the suggested content may comprise a character or word that commonly follows/includes the character(s) in the suggestion request, a piece of stored information that includes the character(s) in the suggestion request, and a corrected spelling of a misspelled word that includes the character(s) in the suggestion request. By displaying the suggested content to the user, the user may be able to conveniently select among the suggested content to use and save time that he or she would have otherwise used to manually input the suggested character(s). After client device 102 receives the suggested content sent for the suggestion request, the status lock is released and becomes available for another suggestion request to acquire.

By using the status lock to regulate when a suggestion request may be sent from client device 102 to server 106, it is ensured that no more than one suggestion request may be sent to server 106 at a time. As such, each suggestion request is processed by server 106 before the next suggestion request (that will include subsequently user input characters) may be sent to and processed by server 106. Such regulation will prevent server 106 from determining suggested content corresponding user input to characters out of the sequence in which they were received by client device 102, as described in further detail below.

Figure 2A:
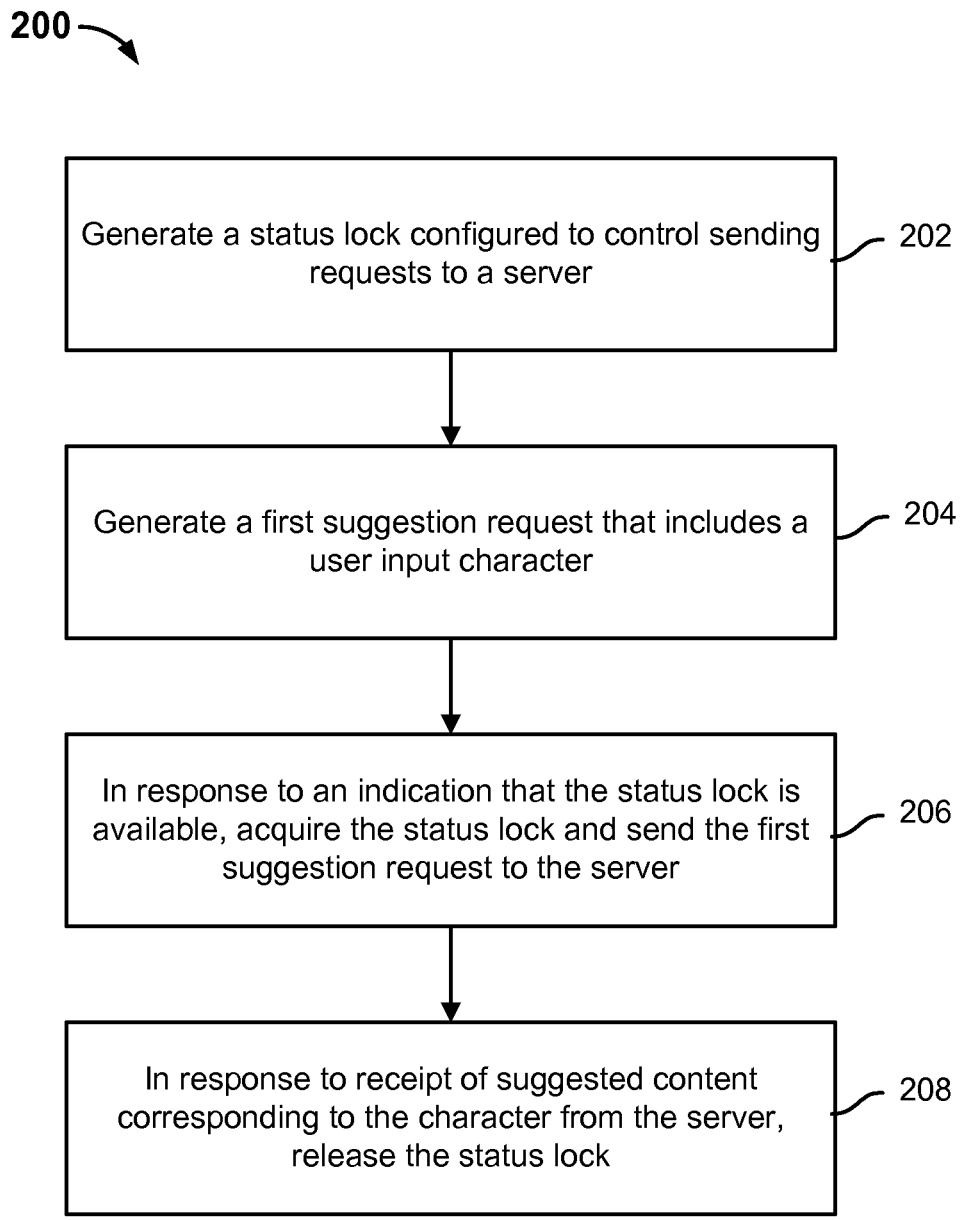
FIG. 2A is a flow diagram showing an embodiment of a process for performing autocomplete of content.

FIG. 2A is a flow diagram showing an embodiment of a process for performing autocomplete of content. In some embodiments, process 200 is implemented at system 100 of FIG. 1. In some embodiments, process 200 is implemented at client device 102 of system 100 of FIG. 1. For example, process 200 may be implemented as a part of software that supports autocomplete and that executes on client device 102.

Process 200 illustrates that a locking mechanism is used to determine when it is appropriate to send a suggestion request that includes at least one user input character (or set of characters) to the server. As will be described below, the locking mechanism will ensure that the suggestion requests generated based on the user input characters are sent to the server from the client device in the same sequence in which they were intended by the user to appear in the input box of the client device.

At 202, a status lock configured to control sending requests to a server is generated. In some embodiments, the status lock may be generated at the client device in response to certain trigger. The trigger may be configured to be associated with an indication that a user will begin to input characters (e.g., over a physical keyboard or over a touchscreen keypad). For example, the trigger is an indication associated with receiving at the client device an initial interaction from a user with respect to an input box of an application (e.g., invoking a search engine or a contact list).

For example, the status lock is implemented as a JavaScript global variable in a client application executing at the client device. Other implementations such as a lock object are possible. A first value associated with the global variable may be configured to indicate that the status lock has been acquired for a suggestion request and a second value associated with the global variable may be configured to indicate that the status lock is available to be acquired. For example, if the value of the global variable has been set to 0, then the status lock may be considered to be available to be acquired for a suggestion request and if the value of the global variable has been set to 1, then the status lock may be considered to have been acquired for a suggestion request.

In some embodiments, only one status lock may be generated (to be associated with each input box) so that the status lock can only be acquired for one suggestion request at a time.

At 204, a first suggestion request that includes a user input character is generated.

Once a character is received by the application executing at the client device, a suggestion request that includes the input character as the pass parameter is generated. In some embodiments, instead of a single character, a set of characters, such as a word or phrase (e.g., that are input rapidly after one another) may be included in the suggestion request. The suggestion request is configured to be sent (e.g., over a network) to a remote server. The server is configured to receive the suggestion request and process the request. For example, the server may process the suggestion request by extracting the character (or set of characters) included in the pass parameter of the request and generate suggested content based at least on the extracted character(s). For example, the suggested content may be based on historical user input patterns that associate certain character(s) with the character (s) extracted from the suggestion request.

At 206, in response to an indication that the status lock is available, the status lock is acquired and the first suggestion request is sent to a server.

In various embodiments, the status lock should be acquired for the suggestion request before it can be sent to the server from the client device. Therefore, after the suggestion request is generated, a check is made to determine whether the status lock has already been acquired (by another suggestion request). If the status lock has not been acquired by another suggestion request, then the status lock may be acquired for the present suggestion request. After the status lock has been acquired for the present suggestion request, the suggestion request may be sent to the server.

For example, if it is determined that the global variable associated with the status lock has been set to the value 0, then it is determined that the status lock can be acquired for the present suggestion request. Otherwise, if the global variable associated with the status lock has been set to the value 1, then it is determined that the status lock cannot be acquired for the present suggestion request.

At 208, in response to receipt of suggested content corresponding to the character from the server, the status lock is released.

Suggested content determined by the server based at least in part on processing the request is received at the client device. For example, suggested content may include individual characters or sets of characters that may be used to complete/complement/supplement the character included in the request. For example, the suggested content may comprise a common word that starts with the character included in the request or the suggested content may comprise a correct spelling of the set of characters included in the request. The client device may display the suggested content at a user interface and a user may select a suggested character and/or set of characters to use at the input box. Sometime after the suggested content is received, the status lock may be released (e.g., the value of the global variable may be changed to a value that indicates that the status lock is available).

As such, process 200 above describes a technique of using a status lock to control when a suggestion request is sent to the server. After a suggestion request is generated based on a character entered by the user, the status lock is acquired for the suggestion request and the suggestion request is sent to the server. After a suggestion request acquires the status lock, other (subsequently generated) suggestion requests cannot acquire the status lock and therefore cannot be sent to the server. It is only after the server has sent back the suggested content for a suggestion request that has acquired the status lock, that the status lock may be released for other suggestion requests to acquire and subsequently be sent to the server. Therefore, the process facilitates receiving suggestion information from the server corresponding to the sequence that characters are input by the user.

In some embodiments, process 200 further includes creating an empty wait queue. As will be described below, the wait queue is maintained at the client device to store characters that have been input by a user at the client device but have not yet been passed via suggestion requests to the server.

In some embodiments, in addition to generating a status lock in response to a trigger that is, for example, associated with an indication that a user will begin to input characters (e.g., over a physical keyboard or over a touchscreen keypad), an empty wait queue may also be generated (e.g., in response to the same trigger). When the user inputs a character (or set of characters) into the client device, a suggestion request is generated. However, if the suggestion request cannot be sent to the server because the status lock has been acquired for a different suggestion request, then the character may be stored in the wait queue. Multiple characters or multiple sets of characters may be stored at the wait queue. Character and sets of characters may be stored at the wait queue in a manner and/or with metadata that preserves the sequence in which they were input by the user and/or the sequence in which they are intended to appear within the input box. When the status lock is released and becomes available, one or more characters may be extracted from the wait queue and included in a suggestion request that is sent to the server. For example, the wait queue may be implemented using an array data structure.

Figure 2B:
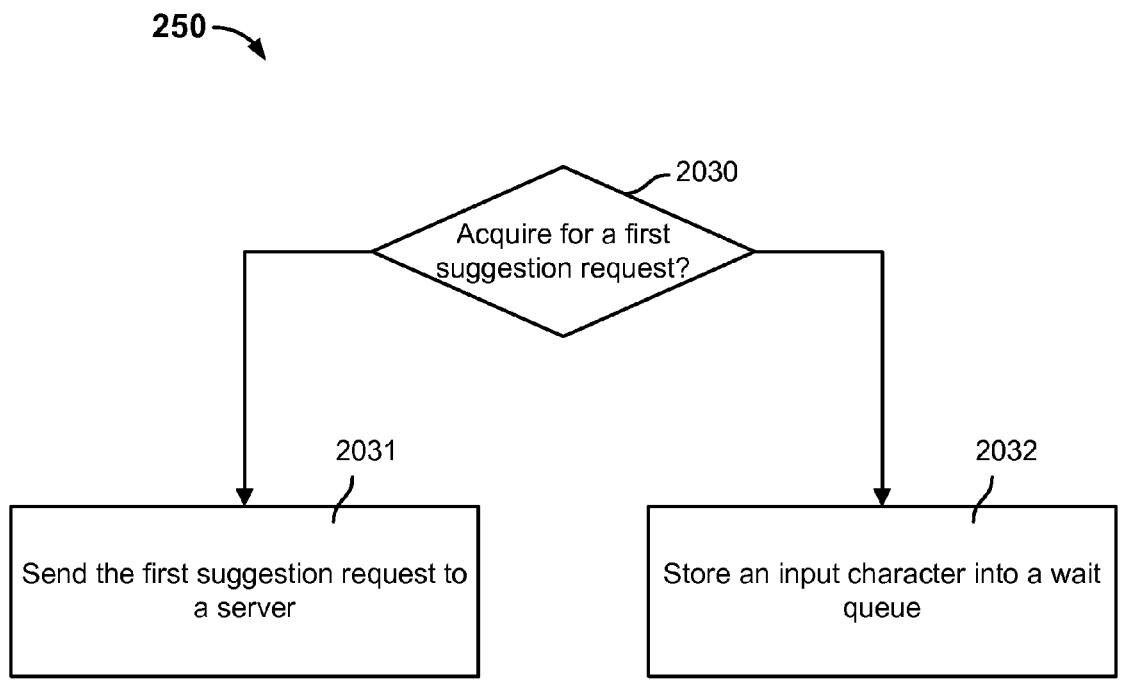
FIG. 2B is a flow diagram showing an embodiment of a process of using a wait queue.

FIG. 2B is a flow diagram showing an embodiment of a process of using a wait queue. In some embodiments, process 250 is implemented at system 100 of FIG. 1. In some embodiments, 206 of process 200 of FIG. 2A is implemented with process 250.

At 2030, it is determined whether the status lock can be acquired for the first suggestion request that includes a user input character. If the status lock can be acquired for the first suggestion request, then 2031 is performed and otherwise, 2032 is performed:

At 2031, the first suggestion request is sent to the server.

The status lock needs to be acquired for a suggestion request before the suggestion request may be sent to the server. Therefore, before the client device sends the first suggestion request to the server, the client device checks whether the status lock can be acquired for the first suggestion request. Then if the status lock can be acquired for the first suggestion request, the first suggestion request can be sent to the server.

At 2032, the character included in the first suggestion request is stored in a wait queue.

If it is determined that the status lock has already been acquired for another suggestion request, then the status lock cannot be acquired for the first suggestion request at this time and so the first suggestion request cannot be sent to the server. As such, the character included in the pass parameter of the first suggestion request can be stored in the wait queue.

Figure 3A:
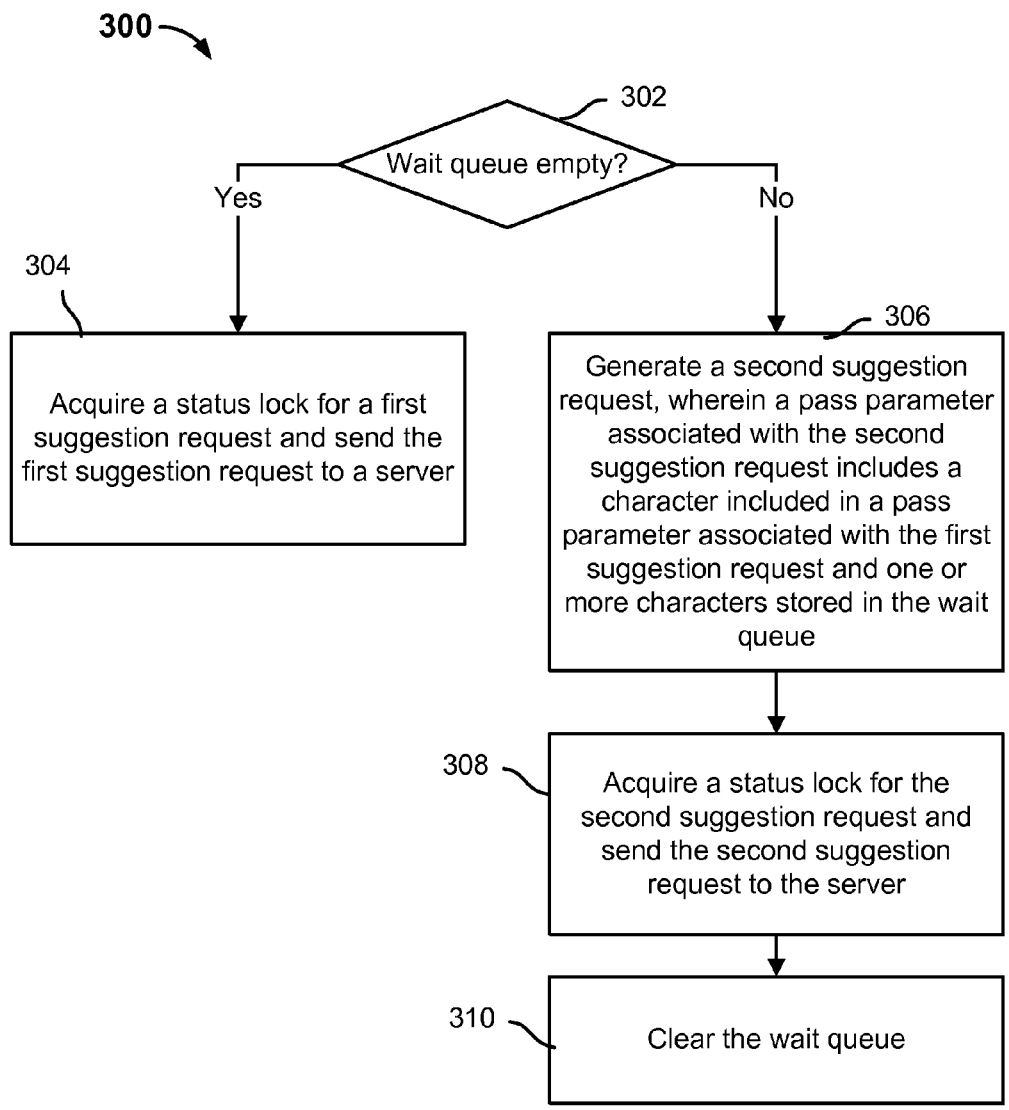
FIG. 3A is a flow diagram showing an embodiment of a process for using a wait queue with autocomplete of content.

FIG. 3A is a flow diagram showing an embodiment of a process for using a wait queue with autocomplete of content. In some embodiments, process 300 is implemented at system 100 of FIG. 1. In some embodiments, process 300 is implemented at client device 102 of system 100 of FIG. 1. In some embodiments, process 300 is used in conjunction with process 200 of FIG. 2A.

Process 300 illustrates an example of using the wait queue where prior to sending a suggestion request, such as the first suggestion request as described with process 200 of FIG. 2A, to the server, the wait queue is checked to determine whether it is empty (i.e., not storing any user input characters that have not yet been sent to the server) or not empty (i.e., storing at least one user input character that has yet to be sent to the server). For example, process 300 is implemented prior to 206 of process 200 of FIG. 2A.

At 302, it is determined whether a wait queue is empty. In the event that the wait queue is determined to be empty, then control passes to 304. Otherwise, control passes to 306. For example, after the status lock has been acquired for the first suggestion request at 206 of process 200 of FIG. 2A, it may be checked whether the wait queue is empty or not. As described above, the wait queue includes characters (or sets of characters) that have been previously input by the user at the client device but that have not yet been sent to the server.

At 304, a status lock is acquired for a first suggestion request and the first suggestion request is sent to a server. If the wait queue is empty, then that indicates that all of the characters input by the user so far have been sent to the server. At this point, the status lock (assuming that it is available) is acquired for the first suggestion request and the first suggestion request may be sent to the server.

At 306, a second suggestion request is generated, wherein a pass parameter associated with the second suggestion request includes a character included in a pass parameter associated with the first suggestion request and one or more characters stored in the wait queue. If it is determined that the wait queue is not empty and is storing one or more characters, then that indicates that there is at least one user input character that has not yet been sent to the server and so a new suggestion request, which is sometimes referred to as the "second suggestion request" in order to distinguish from the first suggestion request of FIGS. 2, 2B, 3A, and 3B, is generated. The pass parameter of the second suggestion request includes the character (or set of characters) included in the pass parameter of the first suggestion request as well as all of the characters stored in the wait queue. In other words, the pass parameter of the second suggestion request includes the combination of the character(s) from the pass parameter of the first suggestion request and the character(s) currently stored in the wait queue.

At 308, the status lock is acquired for the second suggestion request and the second suggestion request is sent to the server. In order to send the second suggestion request to the server, it is determined whether the status lock may be acquired for the second suggestion request. If the status lock is available then it is acquired for the second suggestion request and the second suggestion request can be sent to the server. In some embodiments, after suggested content corresponding to the characters included in the pass parameter of the second suggestion request is received at the client device, the status lock may be released for the next suggestion request to use.

At 310, the wait queue is cleared. Because the character(s) stored in the wait queue have been extracted and included in the second suggestion request, the wait queue is cleared (e.g., the characters stored in the wait queue are discarded and the cleared wait queue is empty).

Figure 3B:
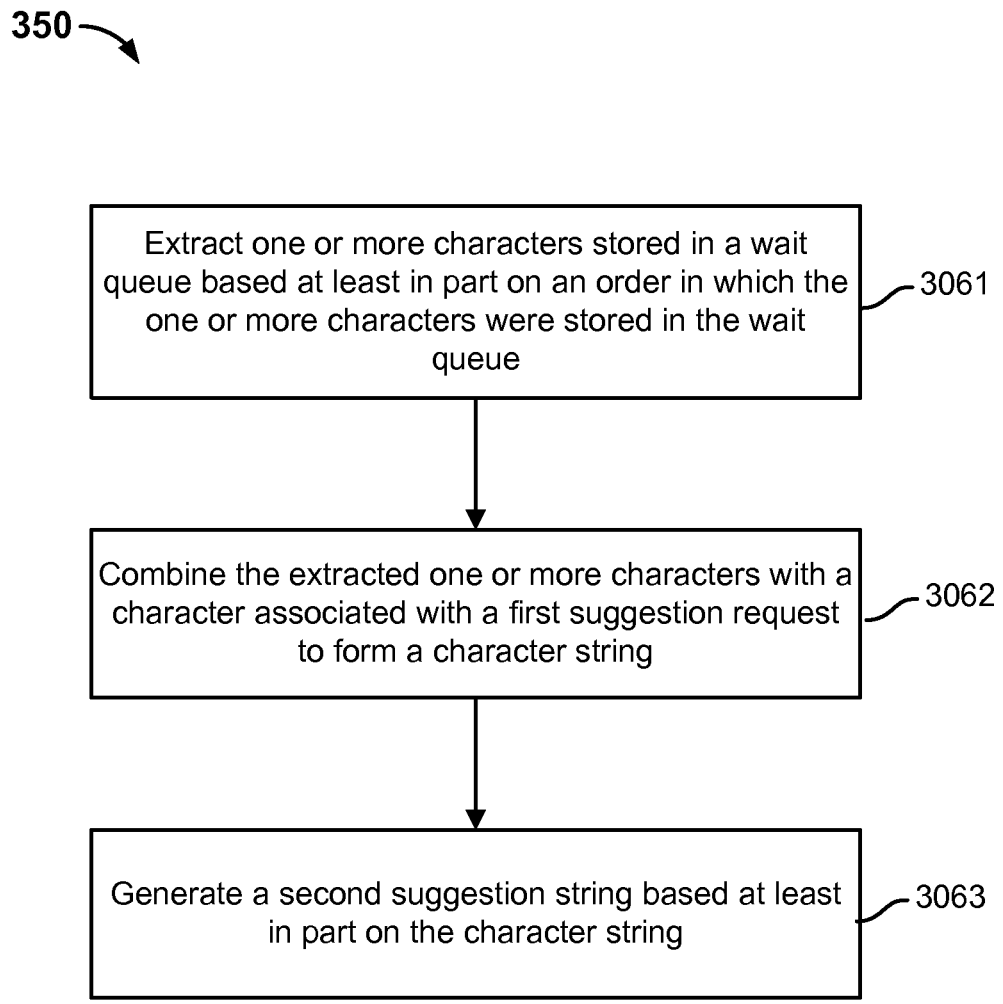
FIG. 3B is a flow diagram showing an embodiment of a process of generating a suggestion request with characters extracted from a wait queue.

FIG. 3B is a flow diagram showing an embodiment of a process of generating a suggestion request with characters extracted from a wait queue. In some embodiments, process 350 is implemented at system 100 of FIG. 1. In some embodiments, 306 of process 300 of FIG. 3A is implemented with process 350.

At 3061, one or more characters stored in the wait queue are extracted based at least in part on an order in which the one or more characters were stored in the wait queue.

When the wait queue is found to store characters that have not been sent to the server, the characters may be extracted from the wait queue in the sequence they were stored into the queue. In various embodiments, characters are stored in the wait queue in the sequence they were input by a user into the client device. In other words, the order or sequence of extracting characters from the wait queue comprises a first in, first out manner.

For example, assume the characters are stored at the wait queue in the following order: a→b→c→d. In this example, the order in which the characters are extracted from the wait queue is also a→b→c→d.

At 3062, the extracted one or more characters are combined with a character associated with a first suggestion request to form a character string.

The characters that were extracted from the wait queue in the first in, first out order are combined with the character(s) (included in the pass parameter of) the first suggestion request to construct a character string. In some embodiments, the character(s) associated with the first suggestion request is placed after the characters extracted from the wait queue.

Continuing the previous example, assume that the character associated with the first suggestion request is "e", and the characters extracted from the wait queue are "a", "b", "c"

and "d" as described above. In this example, the character string constructed from the characters extracted from the wait queue and the character associated with the first suggestion request will be "abcde". When the server processes the character string, the server will consider the characters in the same sequence that they were included in the character string. So in this example, the server will determine suggested content based on the order of a→b→c→d→e.

At 3063, a second suggestion request is generated based at least in part on the character string. In some embodiments, the second suggestion request comprises the first suggestion request with its pass parameter modified to comprise the character string. In some embodiments, the second suggestion request is a new suggestion request that includes a pass parameter that has been set to comprise the character string.

In some embodiments, prior to sending the second suggestion request, the wait queue may be re-checked to make sure that all characters in the wait queue are added to the pass parameter of the suggestion request.

Figure 4:
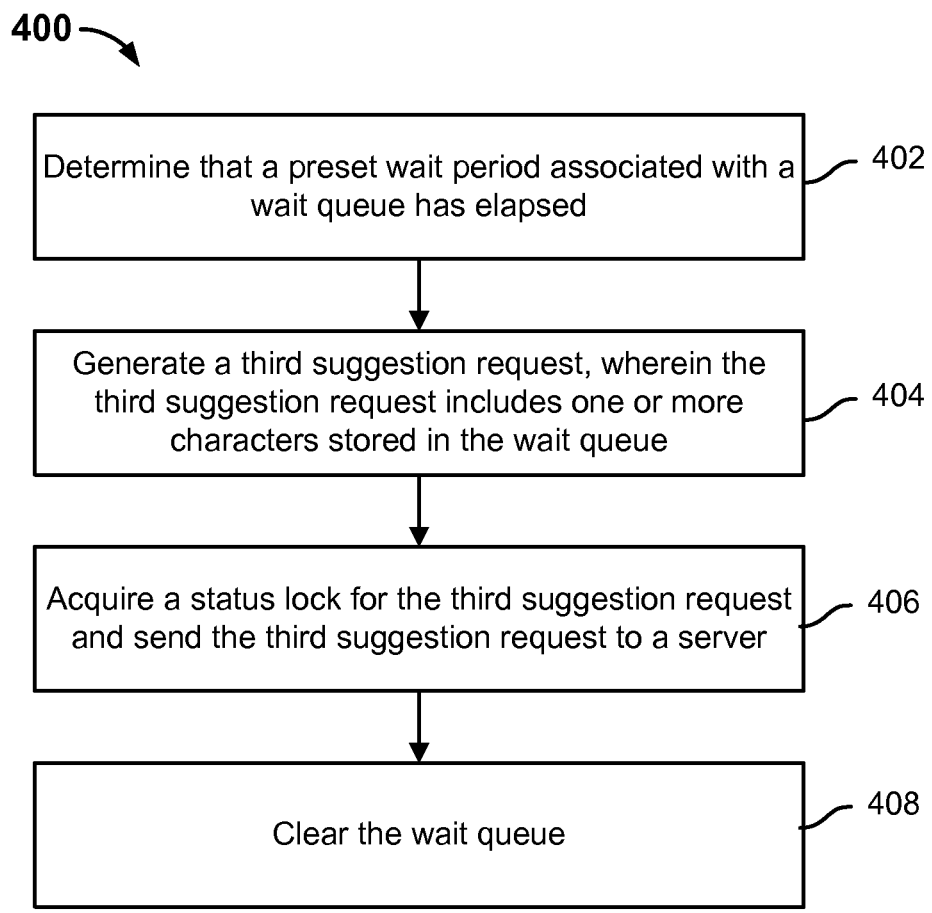
FIG. 4 is a flow diagram showing an embodiment of a process of using a preset wait period to send one or more characters stored in the wait queue to the server.

FIG. 4 is a flow diagram showing an embodiment of a process of using a preset wait period to send one or more characters stored in the wait queue to the server. In some embodiments, process 400 is implemented at system 100 of FIG. 1. In some embodiments, process 400 is implemented at client device 102 of FIG. 1.

Because in some embodiments, the wait queue is not emptied until a user inputs a character that triggers the generation of the first suggestion request, characters that are stored in the wait queue may not be sent to the server for a long time or may never be sent due to the lack of a trigger. Rather than waiting indefinitely for such a trigger to occur, in some embodiments, a wait period may be preset such that if after the wait period elapses and the wait queue is not emptied (i.e., the character(s) in the wait queue are not sent to the server), then a suggestion request is generated to be used to pass the character(s) of the wait queue to the server, as will be described below.

At 402, it is determined that a preset wait period associated with a wait queue has elapsed. In some embodiments, after a first character is added to an empty wait queue or after the wait queue is emptied, a timer is started. The preset wait period may be a time period configured by a system administrator specifically for each wait queue or generally for multiple wait queues. For example, the timer is reset to zero in response to certain operations, such as for example, a new character being added to the wait queue or the character(s) in a wait queue being emptied and included in a suggestion request. However, if such operations do not occur to reset the timer prior to the timer reaching the time period associated with the preset wait period, then a new suggestion request, which is sometimes to referred to as the "third suggestion request" to distinguish from the suggestion requests described with FIGS. 2A, 2B, 3A, and 3B above, is generated.

At 404, a third suggestion request is generated, wherein the third suggestion request includes one or more characters stored in the wait queue. The characters in the wait queue may not be sent to the server for a while if there is no trigger to empty the wait queue. For example, the lack of trigger may be associated with a lack of new user input of a character into the client device and/or a lack of a generated suggestion request in which the stored character(s) may be included. Once the timer reaches the time period associated with the preset wait period, a new suggestion request is generated to be used to pass the characters stored in the wait queue to the server. All of the characters of the wait queue may be included in the pass parameter of the third suggestion request.

At 406, a status lock is acquired for the third suggestion request and the third suggestion request is sent to a server.

At 408, the wait queue is cleared.

The status lock is attempted to be acquired for the third suggestion request. When it is determined that the status lock can be acquired for the third suggestion request (e.g., because the status lock has become available), then the third suggestion request is sent to the server, and the wait queue is cleared. Otherwise, if the status lock has been acquired for another suggestion request, then the third suggestion request will wait and reattempt to acquire the status lock until the status lock is released and therefore can be acquired.

For example, assume that characters a, b, c, and d are entered into the wait queue in the order of a→b→c→d. During the preset wait period, no new characters are added to the wait queue, nor are any characters extracted from the wait queue by a suggestion request. Thus, after the elapse of the preset wait period, a third suggestion request may be generated and the pass parameter of the third suggestion request is set to "abcd". Then, the third suggestion request is sent to the server once the status lock is successfully acquired for it.

After the third suggestion request is sent to the server, suggested content corresponding to the characters of the pass parameter is sent back by the server to be presented to the user at the client device. At this point, the status lock may be released, which will enable other suggestion requests to acquire the status lock.

In some embodiments, process 400 further comprises performing filtering on the suggested content sent by the server prior to presenting the suggested content to the user. Prior to displaying the suggested content receiving from the server, for example, a subset of the suggested content may be determined to be displayed and/or at least a subset of the suggested content may be deleted or hidden from display. For example, in the interest of not overwhelming the user with too many suggested characters at once, only the first 5 characters of the suggested content may be extracted and then displayed for the user. Furthermore, for example, characters may be deleted since the suggestion requests were sent. For example, if character "a" that was previously input by the user into the input box is deleted by the user but the character "a" was included in the pass parameter of a suggestion request that was sent to the server, then a corresponding operation may be performed at this time to delete the suggested content corresponding to the character "a" prior to displaying the suggested content.

In some embodiments, the characters stored in the wait queue are edited. For example, assume that the character "c" is inserted between the character "a" and the character "b" among the user input characters. Assume that character "a" and character "b" are still stored in the wait queue (i.e., character "a" and character "b" have not yet been sent to the server). Thus, a corresponding operation is performed to look up the character "a" and the character "b" in the wait queue and then to insert the character "c" after the character "a" and before the character "b".

Figure 5:
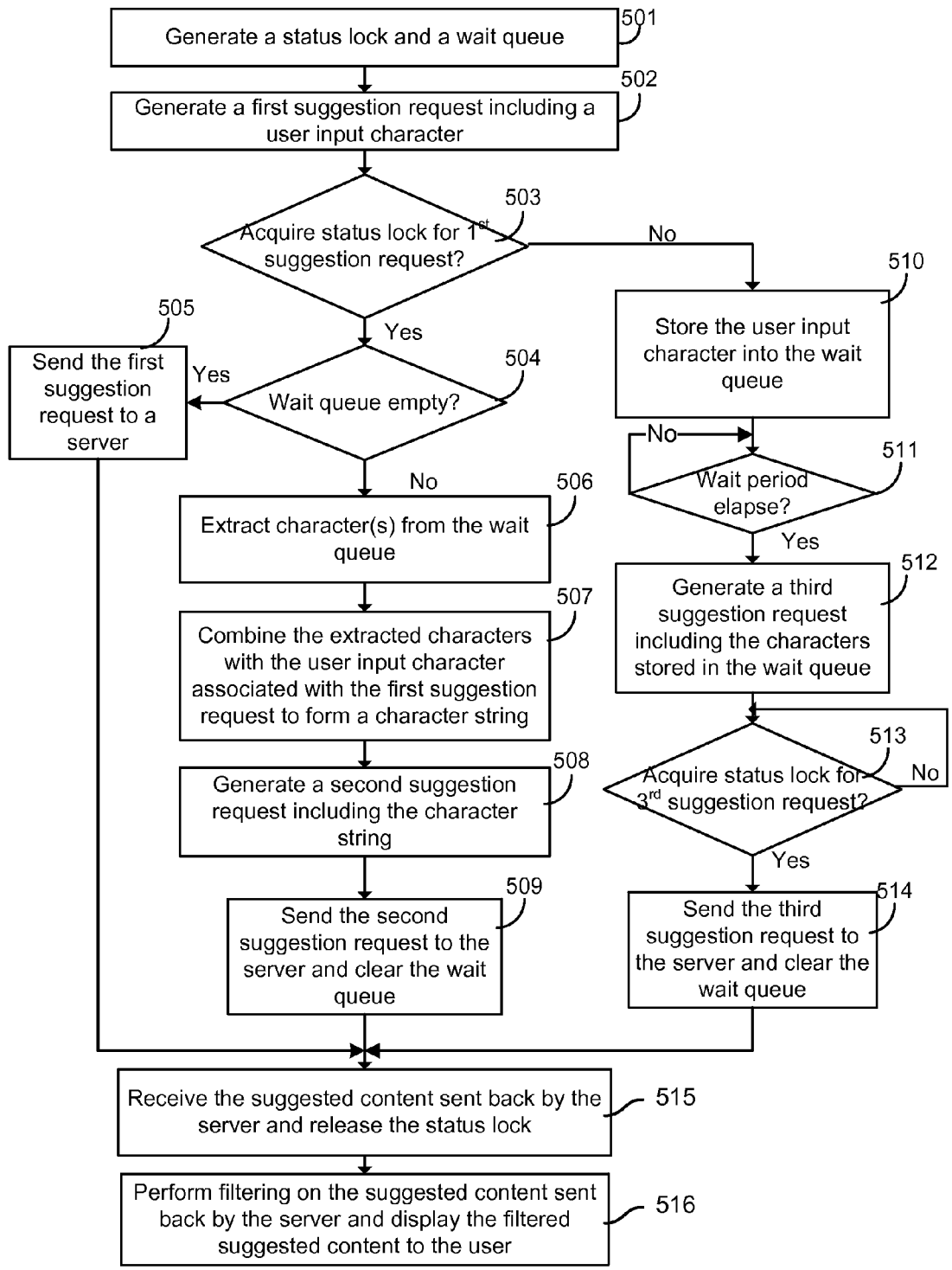
FIG. 5 is a flow diagram showing an embodiment of a process for performing autocomplete of content.

FIG. 5 is a flow diagram showing an embodiment of a process for performing autocomplete of content. In some embodiments, process 500 is implemented at system 100 of FIG. 1. In some embodiments, process 500 is implemented at client device 102 of FIG. 1.

Process 500 describes an example that incorporates process 200 of FIG. 2A, process 300 of FIG. 3A, and process 400 of FIG. 4.

At 501, a status lock and a wait queue are generated. In some embodiments, both the status lock and the wait queue may be generated in response to a trigger such as an initial user interaction with an input box associated with an application executing at a client device. The generated wait queue is empty until a character is determined to be stored at the wait queue.

At 502, a first suggestion request including a user input character is generated, wherein the user input character is generated by a user and received at a client device.

At 503, it is determined whether the status lock can be acquired for the first suggestion request. If the status lock is available and can be acquired for the first suggestion request, then control passes to 504. Otherwise, control passes to 510.

At 504, it is determined whether the wait queue is empty. If the wait queue is determined to be empty, then control passes to 505. Otherwise, control passes to 506.

At 505, the first suggestion request is sent to a server.

At 506, character(s) are extracted from the wait queue. The character(s) stored in the wait queue are extracted in the same order that they were stored at the wait queue so as to preserve the order of the sequence in which the characters are intended by the user to be displayed in the input box.

At 507, the extracted characters are combined with the user input character associated with the first suggestion request to form a character string.

At 508, a second suggestion request including the character string is generated. In some embodiments, a new suggestion request that uses the character string as the pass parameter is generated. In some embodiments, the pass parameter of the first suggestion request is revised to become the character string and this revised first suggestion request is sometimes referred to as the second suggestion request.

At 509, the second suggestion request is sent to the server and the wait queue is cleared. Prior to sending the second suggestion request, it is determined whether the status lock can be acquired. If so, the status lock is acquired for the second suggestion request before it is sent to the server.

At 510, the user input character is stored at the wait queue.

At 511, it is determined whether a preset wait period has elapsed. If the preset wait period has elapsed, then control passes to 512. Otherwise, control returns to 511.

At 512, a third suggestion request including the characters extracted from the wait queue is generated.

At 513, it is determined whether the status lock can be acquired for the third suggestion request. In the event that the status lock can be acquired, control passes to 514. Otherwise, control returns to 513.

At 514, the third suggestion request to the server and the wait queue is cleared.

At 515, suggested content sent back by the server is received and the status lock is released.

At 516, filtering is performed on the suggested content and the filtered suggested content is presented to the user.

The following is an example of applying process 500:

User A is inputting characters into an application executing at a client device that is configured to connect to a network and also to perform autocomplete of content. When user A opens application X on the client device, according to 501, a status lock and an empty wait queue are generated at the client device.

User A wants to look up his friend by of the name of "王非 [Wang Fei]" in application X. User A first enters the character "w" into an input box associated with application X. Based on 502, in response to User A's input of "w" into the client device, a first suggestion request is generated at the client device and where the pass parameter of the first suggestion request includes the character "w".

According to 503, it is then determined whether the status lock is available and can be acquired for the first suggestion request. The following two possible scenarios may occur:

1) In the event that the status lock is available, the status lock can be acquired for the first suggestion request.

Then the wait queue can be checked to determine whether it is empty, as described by 504. If the wait queue is empty, the first suggestion request is sent to the server, as described by 505. After the suggested content sent back by the server is received, as described by 515, the status lock is released. Subsequently generated suggestion requests may acquire the status lock. In the example, according to 516, the suggested content that is presented to the user is the individual characters "王 [Wang]", "汪 [Wang]", "吴 [Wu]", etc. If the user subsequently enters the character "f", the suggestions that are then sent back corresponding to the character "f" are only "飞 [Fei]", "飞 [Fei]", "非 k [Fei]", etc. The server might also send suggested content for the character "f" that is determined in the context of the previous character "w".

However, in the event that the wait queue is not empty, the characters stored in the wait queue can be extracted in the order in which they were stored into the wait queue, as described by 506. For example, the characters stored in the wait queue will be extracted in the order of "l" and then "y" if the characters are stored into the wait queue in the order of l→y. Therefore, the characters stored in the wait queue are extracted as l→y, which is the same sequence in which they were stored at the wait queue. The extracted characters "l" and "y" can be combined with the character "w" included in the first suggestion request to form the character string "lyw", according to 507. A second suggestion request is generated by revising the pass parameter of the first suggestion request to be character string "lyw" according to 508. Once the status lock is able to be acquired for the second suggestion request, the second suggestion request is sent to the server and the wait queue can be cleared according to 509. The suggested content to be sent back by the server is waited on. After the suggested content sent back by the server is received, the status lock can be released, as described by 515. Subsequently generated suggestion requests may acquire the status lock. For example, the returned suggested content may be sets of characters "刘仪伟 [Liu Yiwei]" and/or "李亚伟 [Li Yawei]".

2) However, if it is determined that the status lock has already been acquired for another suggestion request, then the status lock cannot be acquired for the first suggestion request, as described by 510. As a result, the character "w" that is included in the pass parameter of the first suggestion request is stored in the wait queue. It is determined whether the preset wait period has elapsed, as described by 511. If not, the timer associated with the wait queue is checked at a later point. If it is determined that the time has elapsed, then a third suggestion request is generated to include the characters stored in the wait queue, as described by 512. If the characters stored in the wait queue are "l", "y" and "w", respectively, and if the order in which the characters entered the wait queue is l→y→w, then the pass parameter of the third suggestion request will store "lyw" in the order of l→y→w. It is determined whether the status lock can be acquired for the third suggestion request according to 513. If the status lock is not available to be acquired for the third suggestion request, then the status lock is checked again at a later time. If the status lock can be acquired for the third suggestion request, then the third suggestion request is sent to the server and the wait queue is cleared according to 514. The suggested content to be sent back by the server is waited on. After the suggested content sent back by the server is received, the status lock can be released, as described by 515. Subsequently generated suggestion requests may acquire the status lock. For example, the returned suggested content may be sets of characters "刘仪伟 [Liu Yiwei]" and/or "李业伟 [Li Yawei]".

To summarize the example described above, an empty wait queue is generated. If the first suggestion request fails to acquire the unique status lock, the character to be passed using the first suggestion request can be stored in the wait queue to ensure that the character will not be lost and will be sent to the server at a later time. Moreover, after the first suggestion request acquires the unique status lock, the characters in the wait queue can also be added to the pass parameter of the first suggestion request, then the second suggestion request can be generated, and the second suggestion request can be sent to the server. As a result, characters that could not be sent out earlier can be stored in the wait queue until they can be sent to the server, thus guaranteeing that suggested content can be sent back for all characters input by a user at the client device.

Furthermore, if the preset wait period has elapsed and if the characters in the wait queue have not been sent, a third suggestion request may be generated to pass the characters stored in the wait queue to the server. The third suggestion request will acquire (or try to acquire) the status lock until the wait queue is empty. Thus, the preset wait period acts as a further guarantee that suggested content will be sent back for all characters input by a user at the client device.

Figure 6:
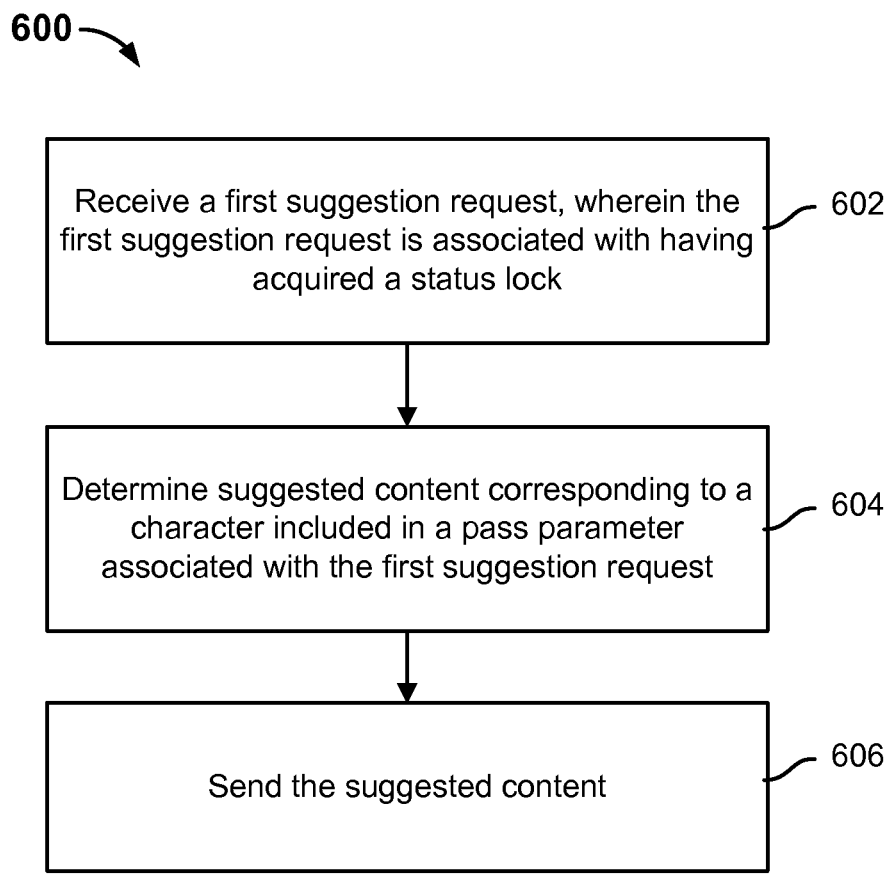
FIG. 6 is a flow diagram showing an embodiment of a process for performing autocomplete of content.

FIG. 6 is a flow diagram showing an embodiment of a process for performing autocomplete of content. In some embodiments, process 600 is implemented at system 100 of FIG. 1. In some embodiments, process 600 is performed at server 106 of FIG. 1.

At 602, a first suggestion request is received, wherein the first suggestion request is associated with having acquired a status lock. When a user inputs characters at an input box of an application executing at a client device, suggestion requests are generated to use to send the input characters to the server, where suggested content corresponding to the characters may be sent back. A first suggestion request may be generated at a client device to include the character(s) entered by the user. When a status lock can be acquired for the first suggestion request, the first suggestion request is sent to the server. So by virtue of the first suggestion request being sent to the server, the first suggestion request must have already acquired the status lock.

At 604, suggested content corresponding to a character included in a pass parameter associated with the first suggestion request is determined. The server may determine suggested content corresponding to each individual character or each set of characters included in the pass parameter of the first suggestion request. For example, the server may determine suggested content by using historical data regarding characters that are commonly used together (e.g., sets of characters that form common phrases or sayings), stored data regarding sets of characters that were previously stored for the user (e.g., the names of the user's contacts), and/or other appropriate techniques. In some embodiments, the server may determine suggested content for the character(s) included in the first suggestion request based on the context of characters included in previously received suggestion requests. In various embodiments, the server processes the characters included in the first suggestion request in the order that they are included in the pass parameter.

For example, a user desires to look up a person's name in an application installed at the client device. The pass parameter of the first suggestion request that is received at the server is the character "w". The server looks up stored data relating to the names of stored contacts in a server database and is able to find surnames such as "王 [Wang]", "汪 [Wang]", and "吴 [Wu]", that begin with the character "w". Thus the determined corresponding suggested content is "王 [Wang]", "汪 [Wang]", and "吴 [Wu]".

At 606, the suggested content is sent. The server can send the suggested content back to the client device. Continuing the previous example, the server sends back "王 [Wang]", "汪 [Wang]", and "吴 [Wu]" as the suggested content for the client device.

While process 600 showed an example of processing the first suggestion request at the server, other suggestion requests (e.g., the second suggestion request and the third suggestion request) can be similarly processed at the server.

Figure 7:
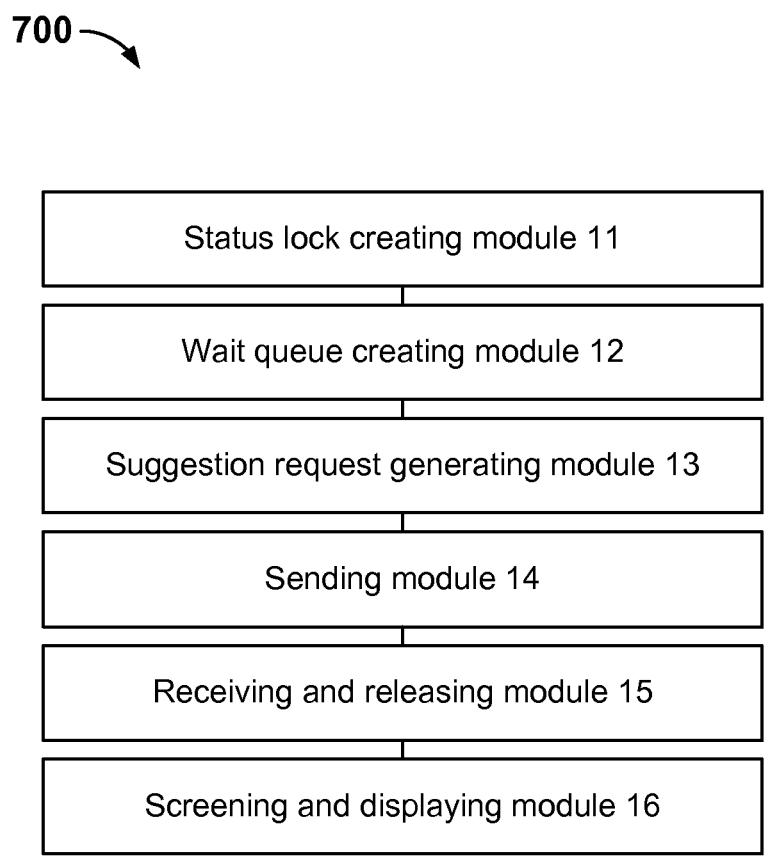
FIG. 7 is a diagram showing an embodiment of a system for performing autocomplete of content.

FIG. 7 is a diagram showing an embodiment of a system for performing autocomplete of content. In the example, system 700 includes status lock creating module 11, wait queue creating module 12, suggestion request generating module 13, sending module 14, receiving and releasing module 15, and screening and displaying 16. In some embodiments, system 700 is an example of a client device.

The modules and sub-modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Status lock creating module 11 is configured to create a status lock for suggestion requests.

Suggestion request generating module 13 is configured to generate a first suggestion request based on a character input by a user. The pass parameter of the first suggestion request comprises the input character.

Sending module 14 is configured to send the first suggestion request to the server when the status lock can be acquired.

Receiving and releasing module 15 is configured to receive suggested content sent back by the server and in response to receipt of the suggested content, to release the status lock.

In some embodiments, system 800 further includes wait queue creating module 12. Wait queue creating module 12 is configured to create an empty wait queue. The wait queue is configured to store characters that are entered by the user but that have not yet been sent to the server.

Screening and displaying module 16 is configured to perform filtering on suggested content sent back by the server prior to displaying it to the user.

In some embodiments, sending module 14 further includes:

An acquiring sub-module that is configured to acquire the status lock, when it is available, for the first suggestion request.

A wait queue depositing sub-module that is configured to store characters included in the pass parameter of the first suggestion request in the wait queue if the status lock cannot be acquired for the first suggestion request.

A checking sub-module that is configured to check whether the wait queue is empty. If the checking sub-module determines that the wait queue is empty, then a first sending sub-module is configured to send the first suggestion request to the server. However, if the checking sub-module determines that the wait queue is not empty, then the generating and sending sub-module is configured to extract the characters stored in the wait queue and add them to the character(s) included in the pass parameter of the first suggestion request to thereby generate a second suggestion request. The checking sub-module then sends the second suggestion request to the server and clears the wait queue.

In some embodiments, the generating and sending sub-module further includes:

An extracting sub-module that is configured to extract characters stored in the wait queue in the first in, first out order in which they were entered into the queue.

A combining sub-module that is configured to combine the extracted characters with the character(s) included in the first suggestion request to form a character string.

Revising sub-module is configured to revise the pass parameter of the first suggestion request to become to the character string so as to generate a second suggestion request.

In some embodiments, sending module 14 further comprises:

A generating sub-module that is configured to generate a third suggestion request using the characters included in the wait queue in the event a preset wait period elapses without a trigger occurring (e.g., a new character being stored at the wait queue and/or a new suggestion request being generated).

A sending sub-module that is configured to send the third suggestion request to the server and clear the wait queue when the status lock is acquired for the third suggestion request.

Figure 8:
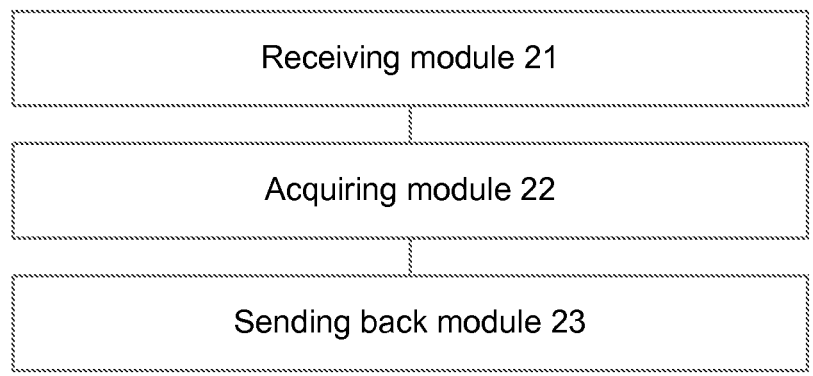
FIG. 8 is diagram showing an embodiment of a system for performing autocomplete of content.

FIG. 8 is diagram showing an embodiment of a system for performing autocomplete of content. In some embodiments, system 800 comprises an example of a server. In the example, system 800 includes receiving module 21, acquiring module 22, and sending back module 23.

Receiving module 21 is configured to receive a first suggestion request that has acquired a status lock.

Acquiring module 22 is configured to determine the suggested content corresponding to the pass parameter included in the first suggestion request.

Sending back module 23 is configured to send the suggested content to the client device from which the first suggestion request was sent.

In regard to device-type embodiments, because they are fundamentally similar to the process embodiments, their descriptions are relatively simple. Refer to partial explanations in the process embodiments where relevant.

The embodiments included in this specification are described in a progressive manner, the explanation of each embodiment focuses on areas of difference from the other embodiments, and the descriptions thereof may be mutually referenced for portions of each embodiment that are identical or similar.

Although some embodiments of the present application have already been described, a person skilled in the art can make other modifications or revisions to these embodiments once he grasps the basic creative concept. Therefore, the attached claims are to be interpreted as including the described embodiments as well as all modifications and revisions falling within the scope of the present application.

A person skilled in the art should understand that the embodiments of the present application can be provided as methods, systems or computer software products. Therefore, the present application can take the form of embodiments comprising entirely of hardware, embodiments comprising entirely of software, and embodiments which combine software and hardware. In addition, the present application can take the form of computer program products implemented on one or more computer-operable storage media (including but not limited to magnetic disk storage devices, CD-ROMs, and optical storage devices) including computer operable program codes.

The present application is described with reference to flow charts and/or block diagrams based on methods, equipment (systems) and computer program products. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on computer-readable storage devices that can guide computers or other programmable data processing equipment to work in a particular way, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

The present application can be described in the general context of computer executable commands executed by a computer, such as a program module. Generally, program modules include routines, programs, objects, components, data structures, etc., to execute specific tasks or achieve specific abstract data types. The present application can also be carried out in distributed computing environments; in such distributed computing environments, tasks are executed by remote processing equipment connected via communication networks. In distributed computing environments, program modules can be located on storage media at local or remote computers that include storage equipment.

Lastly, it must also be explained that, in this document, relational terms such as "first" or "second" are used only to differentiate between one entity or operation and another entity or operation, without necessitating or implying that there is any such actual relationship or sequence between these entities or operations. Furthermore, the terms "comprise" or "contain" or any of their variants are to be taken in their non-exclusive sense. Thus, processes, methods, products, or equipment that comprise a series of elements not only comprise those elements, but also comprise other elements that have not been explicitly listed or elements that are intrinsic to such processes, methods, products, or equipment. In the absence of further limitations, for an element that is limited by the phrase "comprises a(n) . . . ," the existence of additional identical elements in processes, methods, products or equipment that comprise the elements is not excluded.

The described techniques for autocomplete content entry have been described in detail above. This document has employed specific embodiments to expound the principles and forms of implementation of the present application. The above embodiment explanations are only meant to aid in comprehension of the methods of the present application and of its core concepts. Moreover, a person with general skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing autocomplete, comprising:
one or more hardware processors configured to:
   generate a status lock at a client device, wherein the status lock is configured to be used by the client device to control sending requests to a server;
   generate a first suggestion request that includes a user input character, wherein the user input character is received via an input interface that is presented at the client device; and
   determine whether the status lock is available based at least in part on a value associated with the status lock, wherein a first value associated with the status lock indicates that the status lock has been acquired for a previous suggestion request that has been sent to the server, and wherein a second value associated with the status lock indicates that suggested content corresponding to the previous suggestion request has been received from the server;
   in the event that the status lock is associated with the first value, store the user input character in a wait queue; and
   in the event that the status lock is associated with the second value:
      determine that the wait queue includes a plurality of previously input characters;
      generate a second suggestion request based at least in part on the plurality of previously input characters stored in the wait queue and the user input character included in the first suggestion request, wherein the plurality of previously input characters is stored in the wait queue in a manner that preserves a sequence in which the plurality of previously input characters appears in the input interface;
      clear the wait queue;
      update the value associated with the status lock to acquire the status lock for the second suggestion request;
      send the second suggestion request to the server; and
      in response to receipt of suggested content corresponding to the second suggestion request from the server, update the value associated with the status lock; and
one or more memories coupled to the one or more hardware processors and configured to provide the one or more hardware processors with instructions.

2. The system of claim 1, wherein the one or more hardware processors are further configured to generate the wait queue.

3. The system of claim 2, wherein the plurality of previously input characters comprises a first set of previously input characters, wherein the one or more hardware processors are further configured to:
   determine that a preset wait period has elapsed; and
   in response to the determination that the preset wait period has elapsed:
      generate a third suggestion request including a second set of previously input characters stored in the wait queue;
      update the value associated with the status lock to acquire the status lock for the third suggestion request and send the third suggestion request to the server; and
      clear the wait queue.

4. The system of claim 1, wherein the suggested content corresponding to the second suggestion request comprises one or more of the following: a predicted set of one or more characters, a previously stored set of one or more characters, and a corrected spelling associated with a set of one or more characters.

5. The system of claim 1, wherein the one or more hardware processors are further configured to display the suggested content corresponding to the second suggestion request.

6. The system of claim 5, wherein the one or more hardware processors are further configured to perform filtering on the suggested content corresponding to the second suggestion request prior to displaying the suggested content corresponding to the second suggestion request.

7. The system of claim 6, wherein performing filtering on the suggested content corresponding to the second suggestion request includes deleting a portion of the suggested content corresponding to the second suggestion request that corresponds to a receipt of a selection to delete a character.

8. A method for performing autocomplete, comprising:
generating a status lock at a client device, wherein the status lock is configured to be used by the client device to control sending requests to a server;
generating a first suggestion request that includes a user input character, wherein the user input character is received via an input interface that is presented at the client device; and
determining whether the status lock is available based at least in part on a value associated with the status lock, wherein a first value associated with the status lock indicates that the status lock has been acquired for a previous suggestion request that has been sent to the server, and wherein a second value associated with the status lock indicates that suggested content corresponding to the previous suggestion request has been received from the server;
   in the event that the status lock is associated with the first value, storing the user input character in a wait queue; and in the event that the status lock is associated with the second value:
  determining that the wait queue includes a plurality of previously input characters;
  generating a second suggestion request based at least in part on the plurality of previously input characters stored in the wait queue and the user input character included in the first suggestion request, wherein the plurality of previously input characters is stored in the wait queue in a manner that preserves a sequence in which the plurality of previously input characters appears in the input interface;
  clearing the wait queue;
  updating the value associated with the status lock to acquire the status lock for the second suggestion request;
  sending the second suggestion request to the server; and
  in response to receipt of suggested content corresponding to the second suggestion request from the server, updating the value associated with the status lock.

9. The method of claim 8, further comprising generating the wait queue.

10. The method of claim 9, wherein the plurality of previously input characters comprises a first set of previously input characters, further comprising:
determining that a preset wait period has elapsed; and
in response to the determination that the preset wait period has elapsed:
  generating a third suggestion request including a second set of previously input characters stored in the wait queue;
  updating the value associated with the status lock to acquire the status lock for the third suggestion request and sending the third suggestion request to the server; and
  clearing the wait queue.

11. The method of claim 8, wherein the suggested content corresponding to the second suggestion request comprises one or more of the following: a predicted set of one or more characters, a previously stored set of one or more characters, and a corrected spelling associated with a set of one or more characters.

12. The method of claim 8, further comprising displaying the suggested content corresponding to the second suggestion request.

13. The method of claim 12, further comprising performing filtering on the suggested content corresponding to the second suggestion request prior to displaying the suggested content corresponding to the second suggestion request.

14. The method of claim 13, wherein performing filtering on the suggested content corresponding to the second suggestion request includes deleting a portion of the suggested content corresponding to the second suggestion request that corresponds to a receipt of a selection to delete a character.

15. A computer program product for performing autocomplete, the computer program product being embodied in a non-transitory computer readable storage medium and comprising computer instructions for:
  generating a status lock at a client device, wherein the status lock is configured to be used by the client device to control sending requests to a server;
  generating a first suggestion request that includes a user input character, wherein the user input character is received via an input interface that is presented at the client device; and
  determining whether the status lock is available based at least in part on a value associated with the status lock, wherein a first value associated with the status lock indicates that the status lock has been acquired for a previous suggestion request that has been sent to the server, and wherein a second value associated with the status lock indicates that suggested content corresponding to the previous suggestion request has been received from the server;
  in the event that the status lock is associated with the first value, storing the user input character in a wait queue; and
  in the event that the status lock is associated with the second value:
    determining that the wait queue includes a plurality of previously input characters;
    generating a second suggestion request based at least in part on the plurality of previously input characters stored in the wait queue and the user input character included in the first suggestion request, wherein the plurality of previously input characters is stored in the wait queue in a manner that preserves a sequence in which the plurality of previously input characters appears in the input interface;
    clearing the wait queue;
    updating the value associated with the status lock to acquire the status lock for the second suggestion request;
    sending the second suggestion request to the server; and
    in response to receipt of suggested content corresponding to the second suggestion request from the server, updating the value associated with the status lock.

16. The system of claim 1, wherein to generate the second suggestion request based at least in part on the plurality of previously input characters stored in the wait queue includes to:
  extract the plurality of previously input characters from the wait queue;
  combine the extracted plurality of previously input characters with the user input character included in the first suggestion request to form a character string; and
  generate the second suggestion request to include the character string.

17. The method of claim 8, wherein generating the second suggestion request based at least in part on the plurality of previously input characters stored in the wait queue includes:
  extracting the plurality of previously input characters from the wait queue;
  combining the extracted plurality of previously input characters with the user input character included in the first suggestion request to form a character string; and
  generating the second suggestion request to include the character string.

* * * * *